United States Patent [19]

Dosaj et al.

[11] Patent Number: 4,798,659
[45] Date of Patent: Jan. 17, 1989

[54] ADDITION OF CALCIUM COMPOUNDS TO THE CARBOTHERMIC REDUCTION OF SILICA

[75] Inventors: Vishu D. Dosaj, Midland; Daniel H. Filsinger, Bay City, both of Mich.; James E. Trunzo, Eugene, Oreg.

[73] Assignee: Dow Corning Corporation, Midland, Mich.

[21] Appl. No.: 944,733

[22] Filed: Dec. 22, 1986

[51] Int. Cl.$^4$ ............................................. C01B 33/02
[52] U.S. Cl. ..................................... 204/164; 423/350
[58] Field of Search ...................... 423/350, 349, 348; 204/164

[56] References Cited

U.S. PATENT DOCUMENTS

| | | | |
|---|---|---|---|
| 3,322,503 | 5/1967 | Bloom et al. | 423/350 |
| 4,269,620 | 5/1981 | Johansson | 423/350 |
| 4,294,811 | 10/1981 | Aulich et al. | 423/350 |
| 4,377,564 | 3/1983 | Dahlberg | 204/164 |
| 4,435,209 | 3/1984 | Johansson | 423/350 |
| 4,439,410 | 3/1984 | Santen et al. | 423/350 |
| 4,539,194 | 9/1985 | Hglvorsen | 423/348 |
| 4,659,374 | 4/1987 | Alanko et al. | 423/350 |
| 4,680,096 | 7/1987 | Dusaj et al. | 423/350 |

FOREIGN PATENT DOCUMENTS 3483091 8/1985 Fed. Rep. of Germany ...... 423/348

OTHER PUBLICATIONS

Khalafalla and Hass, J. of American Ceramic, *Society*, 55:8(1972), pp. 414–417.
Henderson and Gutowski, *Thermochimica Acta*, 99(1986), pp. 309–316.

*Primary Examiner*—Robert L. Stoll
*Assistant Examiner*—Lori S. Freeman
*Attorney, Agent, or Firm*—Carl A. Yorimoto

[57] ABSTRACT

What is described is an improvement to a process for the preparation of silicon from the reduction of silicon dioxide with a solid carbonaceous reducing agent, the improvement comprising feeding calcium compounds into the reaction zone of a silicon furnace, and controlling and maintaining a desired calcium level in the reaction zone of the silicon furnace. The calcium compounds may be fed to the silicon furnace as a constituent of either the silicon dioxide or solid carbonaceous reducing agent feeds, as a separate feed, or as a combination of two or more of these feeds.

Also described is an improvement to a process for the preparation of silicon carbide from the reduction of silicon dioxide with a solid carbonaceous reducing agent.

5 Claims, No Drawings

ADDITION OF CALCIUM COMPOUNDS TO THE CARBOTHERMIC REDUCTION OF SILICA

BACKGROUND INFORMATION

This invention relates to improvement in the production rate and improvement in the raw material and energy utilization of the carbothermic reduction of silicon dioxide to produce silicon. More specifically, this invention relates to the addition of calcium compounds to achieve these improvements. This invention also relates to the improved preparation of silicon carbide.

Silicon is typically produced via the carbothermic reduction of silicon dioxide ($SiO_2$) with a solid carbonaceous reducing agent. The silicon dioxide may be in the form of quartz, fused or fume silica, or the like. The carbonaceous material may be in the form of coke, coal, woodchips, and other forms of carboncontaining materials. The overall reduction reaction is represented by the equation $$SiO_2 + 2C = Si + 2CO.$$

It is generally recognized that the above reaction in reality involves multiple reactions, the most significant being outlined below:

$$SiO_2 + 3C = SiC + 2CO \quad (1),$$

$$SiO_2 + C = SiO + CO \quad (2),$$

$$SiO + 2C = SiC + CO \quad (3),$$

$$2SiO_2 + SiC = 3SiO + CO \quad (4),$$

$$SiO + SiC = 2Si + CO \quad (5),$$

and $$SiO_2 + Si = 2SiO \quad (6).$$

Experimental work has been carried out by the inventors of the instant invention to study the above reactions. The kinetics of these reactions were studied. These studies have shown that the key reactions involved silicon monoxide (SiO) and silicon carbide (SiC).

Silicon carbide can be produced via the reaction of silicon dioxide and a carbonaceous material according to reaction (1). The so-called Acheson reaction produces silicon carbide by heating a reaction mixture of silicon dioxide and carbon.

Khalafalla and Haas in *Journal of the American Ceramic Society*, 55:8(1972), pp. 414–417, describe a kinetic study of the carbothermal reduction of quartz under vacuum. The reaction studied was the reaction of an equimolar mixture of quartz and graphite to form silicon monoxide and not silicon or silicon carbide. The reaction studied by Khalafalla and Haas can be represented by the equation.

$$SiO_2 + C = SiO + CO.$$

Khalafalla and Haas found that alkaline earth oxides such as calcium oxide, barium oxide, and magnesium oxide promote the above reaction under conditions of vacuum (low pressures). The reaction was studied under conditions of very low pressures, down to $10^{-6}$ torr, and a temperature of approximately 1400° C. The reduction reaction was also studied with a deficiency of carbon relative to silicon dioxide. None of these forementioned conditions would suggest the preparation of silicon in a reduction furnace or the preparation of silicon carbide.

Henderson and Gutowski in *Thermochimica Acta*. 99(1986), pp. 309–316, disclose the effects of iron oxide, $Fe_2O_3$, and chromium oxide, $Cr_2O_3$, on the kinetics of the carbon-silica reactions in a glass-filled phenolic resin. Samples containing 10 to 25 weight percent oxide were tested. Henderson and Gutowski disclose that the oxides lowered the onset temperature at which the reaction of silica and carbon begin; however, Henderson and Gutowski go on to point out that the reaction rate for the silica-carbon reactions is not changed, and may in fact be decreased in the presence of the added metal oxides. Henderson and Gutowski do not suggest or demonstrate a smelting process in a silicon furnace to produce molten silicon or the preparation of silicon carbide as does the instant invention. Further, the very high proportions of iron oxide and chromium oxide disclosed by Henderson and Gutowski would result in the formation of ferrosilicon or chromium-silicon alloys and not the desired silicon of the instant invention.

Reaction (1), supra, is believed by the inventors to have a direct impact upon the rate of silicon generation and the utilization of raw materials and energy. The reaction of $SiO_2$ and solid carbonaceous reducing agent (carbon) to form SiC is a critical step. In present submerged arc silicon furnaces, silicon dioxide and solid carbon are fed to the top of the furnace and molten silicon is tapped from the bottom of the furnace. The top one-third of the furnace operates at a temperature in the range of 1000° to 1600° C. The silicon dioxide and the solid carbon react to form SiC. Any carbon that remains unreacted enters a middle zone of the furnace and reacts with SiO to form SiC, according to Reaction (3) supra. The carbon in this case is competing with SiC for SiO which produces silicon, according to Reaction (5) supra. Maximum conversion of carbon to SiC in the upper zone of the furnace maximizes the rate of silicon formation and also silicon recovery from the raw materials fed. Unreacted carbon from the middle zone of the furnace entering the lower zone or hearth of the furnace could react with molten silicon to form SiC, according to the reaction $$Si + C = SiC \quad (7).$$

This reaction could also occur with silicon that may exist as a vapor in the lower zone of the furnace. The SiC that is formed, according to Reaction (7) supra, is found to be dense and non-reactive. Thus, the combination of unreactive SiC and the actual consumption of silicon formed results in lowered utilization of the starting raw materials.

The objective of the instant invention is to apply the experimental findings, supra, to improve the output from a silicon furnace via the carbothermic reduction of silicon dioxide. A second objective of the instant invention is to improve the utilization of raw materials and electrical energy in the manufacture of silicon. A further objective of the instant invention is to increase the production rate for a process for the preparation of silicon carbide.

It has been unexpectedly found that the addition of calcium compounds to Reaction (1). supra, significantly increases the rate at which $SiO_2$ reacts with carbon to form SiC. Increases of reaction rate of as much as 200 percent for Reaction (1) were observed, as will be detailed in the examples infra. These findings can be applied directly to a process for the preparation of silicon carbide. These findings were then applied to a production-scale silicon furnace. It was found that the addition of a calcium compound as a constituent of the $SiO_2$ or the solid carbonaceous reducing agent fed to a silicon furnace. or as a separate feed. increases the silicon production rate by as much as 12 percent. Further, raw material utilization was also improved significantly. Silicon recovery from the furnace was increased by as much as 10 to 15 percent. Additionally. the consumption of the graphite electrodes which normally account for approximately 10 percent of the carbonaceous reducing agents needed to reduce the silicon dioxide fed was reduced by as much as 30 to 40 percent. The observations of increased production rate and improved raw material usage are illustrated in the examples. infra. These improvements in production rate and raw material utilization are believed by the inventors to be the direct result of a significant increase in the rate of Reaction (1), supra, in which $SiO_2$ and carbon are reacted to form SiC.

DESCRIPTION OF THE INVENTION

In accordance with the instant invention, there is provided an improvement to the process for the carbothermic reduction of silicon dioxide to prepare silicon in which the furnace output and the utilization of raw materials and electrical energy are increased. What is described. therefore. is an improvement in a process for the preparation of silicon from the reduction of silicon dioxide with a solid carbonaceous reducing agent. said process comprising:

(A) passing electrical energy into a reaction zone of a silicon furnace;
(B) feeding silicon dioxide and solid carbonaceous reducing agents into the reaction zone:
(C) recovering molten silicon from the reaction zone; and
(D) handling by-product gases from the reaction zone.

the improvement comprising feeding non-phosphorous containing calcium compounds into the reaction zone of the silicon furnace, and controlling a desired calcium level in the reaction zone of the silicon furnace.

The process for the preparation of silicon from the reduction of silicon dioxide with a solid carbonaceous reducing agent can be any of those processes known in the art of metallurgy. Such processes include a submerged electric arc furnace. Also included is a process in which the electrical energy is provide by a transferred arc plasma.

For the purposes of the instant invention, the term "calcium content" means the amount of calcium in the feeds to the silicon furnace. the feeds being the silicon dioxide. the solid carbonaceous reducing agent. the combined feed of both, or a separate feed of a calcium compound. Likewise. the term "calcium level" means the amount of calcium in the reaction zone of the silicon furnace.

For the purposes of the instant invention. the term "a desired level of calcium" means that level of calcium in the reaction zone of a silicon furnace above which the beneficial results of improved silicon production rate and improved raw material and energy utilization are realized. A calcium level in the reaction zone of the silicon furnace of about 0.2 weight percent is believed by the inventors to be the lower limit of calcium for which the beneficial results of improved furnace output and improved utilization of raw materials and electrical energy were realized. A calcium level of about 2 weight percent is believed to be the practical upper limit. Addition of calcium compounds to levels above 2 weight percent are not viewed as providing increased benefits. Additionally. there are uses for silicon which require very low calcium content in the final silicon. Thus. addition of calcium compounds in excess of that needed would require increased after-processing to reach the desired very low calcium content. The after-processing to remove excess calcium can be a process such as the refining of silicon with oxygen to remove the calcium as an oxide in a slag.

The calcium compound may be added to the reaction zone of the silicon furnace in several ways. The calcium compound may be added as a constituent of the silicon dioxide or solid carbonaceous reducing agent fed to the furnace or the combination of these two feeds. Silicon dioxide varies significantly in calcium content, depending upon the source of the silicon dioxide. As an example, it has been found that the calcium content of naturally occurring quartz used in the manufacture of silicon can vary in a range from about 0.003 to 5 weight percent. Correspondingly. the calcium content of the solid carbonaceous reducing agent can vary significantly. depending upon its source. An example of carbonaceous reducing agents with high calcium content, oak wood chips. can have a calcium content of between 0.2 and 0.4 weight percent. while fir wood chips can have a calcium content of about 0.02 weight percent. In adding the calcium compound as a constituent of one or both of the feeds, the known methods for feeding these solids to the reaction zone of the silicon furnace can be utilized.

A calcium compound may be added as a separate feed to the reaction zone of the silicon furnace, along with the silicon dioxide and solid carbonaceous reducing agent feeds. The calcium compound can be selected from a group consisting of calcium oxide. calcium carbonate. calcium fluoride. and the like. The calcium compound may be fed to the silicon furnace as a solid material. The form of the solid calcium compound can be selected from a group which consists of powders. granules. pebbles. and lumps. The solid calcium compound can be fed by similar known means for feeding solids as used in the feeding of silicon dioxide and the solid carbonaceous reducing agent. The calcium compound may also be fed as a water solution to the silicon furnace. This water solution can be fed by any conventional means for feeding liquids such as pumps, gravity feed, or gas-pressure feed. Finally. the calcium compound may be fed as a water suspension or slurry. This water suspension or slurry may be fed by conventional means for feeding suspensions or slurries such as slurry pumps. screw feeders. and the like.

Controlling and maintaining the calcium level in the reaction zone of the silicon furnace is effected by analyses of the starting raw materials and the silicon as it is tapped from the furnace and altering the feeds to maintain the desired overall level within the silicon furnace. Analyses for calcium content of the feeds can be effected by analytical techniques known in the art. such as spectrographic means. The source of the silicon dioxide and carbonaceous reducing agent feeds can be altered to control and maintain the calcium level. Further, a separate feed of a calcium compound may be added to supplement the calcium content of the furnace feeds to maintain the desired calcium level. A combination of all the above means for controlling and maintaining the desired calcium level may be applied.

In accordance with the instant invention, there is also provided an improvement to a process for the carbothermic reduction of silicon dioxide to prepare silicon carbide in which production output is significantly increased. What is described, therefore, is an improvement in a process for preparing silicon carbide from the reaction of silicon dioxide and solid carbonaceous reducing agent, said process comprising:

(A) heating a mixture of silicon dioxide and solid carbonaceous reducing agents in a reaction vessel: and (B) recovering silicon carbide as a solid, the improvement comprising feeding calcium compounds into the reaction vessel. and controlling and maintaining a desired calcium level in the mixture in the reaction vessel.

The process for preparing silicon carbide by the carbothermic reduction of silicon dioxide with a solid carbonaceous reducing agent can be any known process in the art such as the Acheson reaction.

The reaction vessel can be a known design in the art such as a metallurgical furnace or a packed bed reactor. The mode of heating the reaction vessel and the solid reactants can be known means such as a submerged electric arc or an electric arc plasma.

A calcium level in the mixture of silicon dioxide and solid carbonaceous reducing agents in the reaction vessel of about 0.2 weight percent is believed by the inventors to be the lower limit of calcium content for which the beneficial result of increased silicon carbide output will be realized.

The calcium compound may be added to the reaction vessel silicon furnace in the several ways described. supra.

Controlling and maintaining the calcium level in the reaction vessel is effected by analyses of the starting raw materials. Analyses for calcium content of the feeds can be effected by analytical techniques known in the art, such as spectrographic means. The source of the silicon dioxide and carbonaceous reducing agent feeds can be altered to control and maintain the calcium level. Further. a separate feed of a calcium compound may be added to supplement the calcium content of the feeds to maintain the desired calcium level. A combination of all the above means for controlling and maintaining the desired calcium level may be applied.

PREFERRED EMBODIMENT OF THE INVENTION

In a preferred mode of carrying out the instant invention to produce silicon. the calcium level in the reaction zone of the silicon furnace is controlled and maintained at greater than about 0.2 weight percent. A more preferred calcium level in the reaction zone is greater than about 0.3 weight percent. The most preferred calcium level in the reaction zone is in a range of from about 0.3 to about 2.0 weight percent.

The preferred mode of controlling and maintaining the desired calcium level in the reaction zone of the silicon furnace is monitoring the calcium content of the silicon dioxide and solid carbonaceous reducing agent feeds and feeding a calcium compound separately to supplement the calcium content of the silicon dioxide and solid carbonaceous reducing agent feeds.

In a preferred mode of carrying out the instant invention to produce silicon carbide, the calcium level in the reaction vessel is controlled and maintained at greater than about 0.2. A more preferred calcium level in the reaction vessel is greater than about 0.4 weight percent.

The following examples are presented to be illustrative of the instant invention and are not to be construed as limiting the instant invention as delineated in the claims.

EXAMPLE 1

Work was carried out to study the kinetics of the reaction of silicon dioxide and a solid carbonaceous reducing agent and the impact of metallic impurities in the silicon dioxide upon this reaction. This reaction is represented by the equation

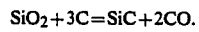

$$SiO_2 + 3C = SiC + 2CO.$$

This experimental work was carried out using a combination of thermogravimetric and infrared analytical techniques. These two experimental and analytical techniques are well-known to those skilled in the art of studying chemical reactions. The thermogravimetric analyses (TGA) were performed on a Netzsch Simultaneous Thermal Analyzer, Model 429, equipped with a 2400° C. tungsten resistance furnace. The thermogravimetric analyzer was purchased from Netzsch Brothers, Lionville, Pa. The exit gases from the thermogravimetric analyzer were passed through a Lira Infrared Analyzer, Model 202, sensitized for carbon monoxide in the range of 100 ppm to 2 volume percent. The infrared analyzer was purchased from Mine Safety Appliance, Pittsburgh, Pa. Data acquisition. analysis. and display were accomplished with a Hewlett Packard 3354B Laboratory Computer System.

The experimental procedure was essentially the same for the several runs carried out in this study. The samples to be evaluated were ground in a boron carbide mortar and pestle and screened to a uniform particle size of less than 50 microns. The samples were stored in glass containers. The samples were tamped into a tantalum TGA crucible that was 5 millimeters outside diameter and 5 millimeters in height. The sample of approximately 100 milligrams in weight was place into the tantalum crucible and tamped using a pressure estimated at 10 pounds per square inch. gauge. The crucible and its contents were then placed in a tungsten crucible to shield the tantalum crucible. The crucible and its contents were placed in the TGA instrument and heated at a rate of 100° C./ min. to the desired isothermal temperature ranging from about 1400° to 1800° C. A 200 milliliter per minute flow of low-oxygen (<0.5 parts per million) helium was continuously maintained. Weight loss of the sample and carbon monoxide evolution were continuously monitored.

A reactivity value or rate was determined by applying homogeneous first-order kinetics, where:

$$\ln \frac{W_o}{W_o - x} = kt$$

where $W_o$ = Initial weight of reactants
$x$ = Decrease in weight of reactants
$t$ = Time, in seconds
$K$ = Relative rate, in seconds$^{-1}$.

The reactivity rate will be the comparative measure used in presenting the results of this study.

In this study, a pure silicon dioxide sample and several commercially available quartzite samples were evaluated. The pure silicon dioxide sample was S-1061, 325 mesh material, purchased from Cerac, Milwaukee, Wis. Analysis of the pure silicon dioxide showed that it was alpha-quartz. These silicon dioxide samples, identified as Samples A through I, are listed below with source and analyses of iron, calcium, and aluminum impurities (reported as weight percent of the silicon dioxide sample as "%Fe", "%Ca", and "%Al") in Table 1.

TABLE 1

| Sample | Source | % Fe | % Ca | % Al |
|---|---|---|---|---|
| A | Pure silicon dioxide | — | — | — |
| B | Yuba (California) | 0.05 | 0.010 | 0.11 |
| C | Mt. Rose (British Columbia) | 0.007 | 0.002 | 0.005 |
| D | Bear River (California) | 0.05 | 0.004 | 0.016 |
| E | Australia | 0.03 | 0.006 | 0.23 |
| F | Brazil | 0.007 | 0.003 | 0.005 |
| G | Big Gun (California) | 0.02 | 0.013 | 0.016 |
| H | Mountain Mineral (British Columbia) | 0.06 | 0.42 | 0.10 |
| I | Bristol (Oregon) | 0.06 | 2.30 | 0.016 |

The solid carbonaceous reducing agent utilized was G-1059 graphite purchased from Cerac, Milwaukee, Wis.

The silicon dioxide and solid carbonaceous reducing agent were mixed in a proportion of three moles of carbon per mole of silicon dioxide. The samples were heated to a temperature of 1560? C. The sample was maintained at this temperature for the study of the reaction rate.

The computed results of reactivity rate, as defined supra, are summarized in Table 2.

TABLE 2

| Sample | Source | Reactivity Rate, sec$^{-1}$ × 10$^4$ |
|---|---|---|
| A | Pure silicon dioxide | 15 |
| B | Yuba (California) | 10 |
| C | Mt. Rose (British Columbia) | 11 |
| D | Bear River (California) | 13 |
| E | Australia | 15 |
| F | Brazil | 15 |
| G | Big Gun (California) | 19 |
| H | Mountain Mineral (British Columbia) | 36 |
| I | Bristol (Oregon) | 41 |

From the above results, the only significant difference among the several silicon dioxide samples is the calcium impurity level. The results demonstrate that the calcium content of the silicon dioxide fed to the carbothermic reduction of silicon dioxide has a direct effect upon the reactivity rate of the reaction of silicon dioxide and carbon to form silicon carbide and carbon monoxide.

EXAMPLE 2

Further experimental studies using the thermogravimetric-infrared analyses techniques and procedures utilized in Example 1 were carried out to further define the role of impurities or additives in the reaction of silicon dioxide and carbon. In this study, pure silicon dioxide and pure carbon were reacted with various additives and combinations of these additives. The basis for the additives and mixtures to be studied was a reaction mixture containing a highly reactive Bristol quartzite sample similar to that evaluated in Example 1. The reaction mixture had the following metals analyses (reported in weight percent):

Aluminum 0.026
Iron 0.05
Calcium 1.46

A control run was made using pure silicon dioxide and pure carbon. This run will be designated Sample J. The reaction mixture above, using Bristol quartzite, is designated as Sample K. Reaction mixtures with various combinations of $Al_2O_3$, CaO, $Fe_2O_3$, and other calcium containing compounds were evaluated. These additives are added so that the levels of $Al_2O_3$, CaO, $Fe_2O_3$, and other calcium compounds are similar (individually) to the levels of these impurities in the reaction mixture using Bristol quartzite. The additives utilized for this study were purchased as powdered reagents from Fischer Scientific. These combinations are designated Samples L through S. The results of these runs are summarized in Table 3. The samples are identified by the additive or additives in the reaction mixture and the observed reactivity rate at 1560° C., as defined in Example 1.

TABLE 3

| Sample | Additive | Reactivity Rate, sec$^{-1}$ × 10$^4$ |
|---|---|---|
| J | Control | 15 |
| K | Bristol Quartzite | 41 |
| L | $Al_2O_3$ CaO $Fe_2O_3$ | 35 |
| M | $Al_2O_3$ | 15 |
| N | $Fe_2O_3$ | 14 |
| O | $Al_2O_3$ $Fe_2O_3$ | 16 |
| P | CaO | 41 |
| Q | $Al_2O_3$ CaO | 35 |
| R | $Fe_2O_3$ CaO | 35 |
| S | $CaF_2$ | 37 |

The results of the above experimentation demonstrate the beneficial effect of the addition of calcium compounds upon the reaction of silicon dioxide and carbon to form silicon carbide and carbon monoxide.

EXAMPLE 3

(Not within the scope of the invention)

The operation of a standard submerged arc furnace to produce silicon is reviewed as a baseline to compare against the instant invention in which calcium compounds are added to the furnace to enhance the production rate of silicon. The furnace in which the production of silicon and the effects of the addition of calcium compounds to a furnace were evaluated in a furnace of a design familiar to those skilled in the art of silicon manufacture. The furnace has a power rating of approximately 18 megawatts.

The operation of the furnace was monitored for a month to establish a baseline against which the instant invention could be compared. The feed to the furnace comprises a mixture of quartzite. coal. coke. and woodchips. The ratio of the reactants are controlled so that the fixed carbon content of the combined coal, coke, and woodchips is approximately 90 percent of the theoretical amount of carbon necessary to reduce the silicon dioxide. The remainder of the carbon is supplied by consumption of the graphite electrodes.

The following general procedure was followed for the continuously operating furnace:
 a. All raw materials are individually analyzed. Among the analyses are metals analysis
 b. Raw materials are individually added to feed hoppers in the desired proportions
 c. Charges of the raw material mix are periodically added to the furnace to maintain the level of furnace contents
 d. Molten silicon is tapped into a ladle from the furnace for 65 minutes out of every 2 hours
 e. Silicon requiring low calcium content is refined by contacting molten silicon in the ladle with oxygen gas The raw materials utilized were:
 1. Silicon dioxide as quartzite from two sources, Yuba and Bear River both from California
 2. Coal was Joyner Blue Gem Coal purchased from Hickman-Williams & Co.. Kentucky.
 3. Petroleum coke from Texaco
 4. Fir woodchips All raw materials are analyzed for metals. Table 4 is a summary of the analyses of the raw materials. The pertinent results listed in Table 4 is weight percent calcium content, denoted as % Ca. The silicon tapped from the furnace is also analyzed for calcium content.

TABLE 4

| Raw Material | % Ca |
|---|---|
| Quartzite | 0.01 |
| Coal | 0.1 |
| Coke | 0.007 |
| Woodchips | 0.02 |

Four results of operation were monitored as measures of the performance of the furnace. These four results, defined below, are averaged for the months operation:
 1. Production rate, pounds per hour silicon=lb./hr. Si
 2. Electrical energy consumption, kilowatt-hours per pound of silicon=kwh./lb. Si
 3. Silicon recovery=Percent of theoretical silicon fed in silicon dioxide that is recovered as refined silicon=%Recv.
 4. Graphite electrode consumption. pounds of electrode per ton of silicon produced=lb./ton
 5. Calcium content of tapped silicon. weight percent calcium=% Ca.

The above results are a baseline against which the results of the examples. infra, will be compared. The results of the baseline run and the subsequent furnace runs will be summarized in Table 5 following the discussion of the examples. infra. The baseline run is designated as Sample AA in Table 5.

EXAMPLE 4

Two furnace runs were made in which oak chips. found to be high in calcium content, were fed to a silicon furnace as the source of wood chips. The furnace and general procedures of Example 3 were utilized.

The oak chips had the following analysis (expressed in weight percent):
 % Fe 0.009
 % Ca 0.20
 % Al 0.008

The results of these two furnace runs in which oak chips. high in calcium content, were added to the feed to a silicon furnace to increase the calcium level in the reaction zone of the furnace are summarized as Samples BB and CC, respectively. in Table 5. infra.

EXAMPLE 5

A furnace run was made in which a quartzite, high in calcium content was fed as a mixture with other quartzites to a silicon furnace. The furnace and general procedures of Example 3 were utilized.

The high-calcium quartzite used in the quartzite feed mixture was Bristol quartzite from Oregon. The calcium analysis (expressed in weight percent) of the quartzite was 0.79 weight percent.

The results of this furnace run in which quartzite. high in calcium content, was fed to a silicon furnace to increase the calcium level in the reaction zone of the furnace is summarized as Sample DD in Table 5. infra.

EXAMPLE 6

A third furnace run was made in which a calcium compound was added to the raw materials fed to the furnace as a calcium carbonate slurry. The furnace and general procedures as those utilized in Example 3.

In this run. calcium carbonate with a particle size of minus 100 mesh was mixed with water in a 50/50 weight percent mixture. 0.10 weight percent xanthum gum was added to the slurry to act as a suspension agent. The calcium carbonate was purchased from Surecrop Farm Services, Junction City. Oreg. The slurry was mixed and stored in a 1000-gallon tank. The calcium carbonate slurry was pumped through spray nozzles and sprayed on the mixed charges of raw materials as they were fed to the furnace. The proportions of calcium carbonate slurry were controlled so that the calcium content of the tapped silicon was maintained at between about 0.40 and 0.50 weight percent. To maintain this calcium level, approximately 2 gallons of the calcium carbonate slurry was sprayed on approximately 2300 pounds of solid feeds to the furnace.

The results of this furnace run in which calcium carbonate was added to the feed to a silicon furnace to increase the calcium level in the reaction zone of the furnace is summarized as Sample EE in Table 5. infra.

Table 5 is a summary of the results of Examples 3, 4, 5, and 6. supra. The performance results and their definitions are outlined in Example 3, supra. The results of production rate. electrical energy consumption, silicon recovery. and graphite electrode consumption are expressed as relative figures compared to the baseline run, Sample AA, these results being expressed as 1.00 for Sample AA. Calcium content is expressed as the actual calcium content of the tapped silicon.

TABLE 5

| Sample | lb./hr. | kwh./lb. | % Recv. | lb./ton | % Ca |
|---|---|---|---|---|---|
| AA | 1.00 | 1.00 | 1.00 | 1.00 | 0.07–0.21 |
| BB | 1.14 | 0.91 | 1.10 | 0.59 | 0.5–0.8 |
| CC | 1.11 | 0.94 | 1.10 | 0.68 | 0.4–0.75 |
| DD | 1.10 | 0.93 | 1.11 | 0.64 | 0.31–0.95 |
| EE | 1.14 | 0.91 | 1.12 | 0.79 | 0.26–0.50 |

The above results demonstrate the beneficial effect of higher levels of calcium in the reaction zone of a silicon furnace. Samples BB and CC. respectively. demonstrate that calcium can be effectively added to the furnace as a constituent of the solid carbonaceous reucing agents fed to the furnace. Sample DD demonstrates that calcium can be effectively added to the furnace as a constituent of the silicon dioxide feed to the furnace. Finally. Sample EE demonstrates that calcium can be effectively added to the furnace as a calcium compound in a separate feed to the furnace. The beneficial results demonstrated are: (1) improved silicon production rate: (2) lowered electrical energy consumption; (3) improved silicon recovery. and therefore, improved utilization of the silicon dioxide fed: and (4) reduced consumption of the graphite electrodes. and therefore. improved utilization of the solid carbonaceous reducing agents fed.

What is claimed is:

1. In a process for the preparation of silicon from the reduction of silicon dioxide with a solid carbonaceous reducing agent, said process comprising:
   (A) passing electrical energy into a reaction zone of a silicon furnace;
   (B) feeding silicon dioxide and solid carbonaceous reducing agents into the reaction zone;
   (C) recovering molten silicon from the reaction zone; and
   (D) handling by-product gases from the reaction zone, the improvement comprising controlling and maintaining a calcium level in a range from a range from about 0.2 to 2.0 weight percent in the reaction zone of the silicon furnace by monitoring the calcium level in the molten silicon and feeding a calcium compound separately from the silicon dioxide and the carbonaceous reducing agents to supplement calcium content of the silicon dioxide and solid carbonaceous reducing agents, said calcium compound being selected from a group consisting of calcium oxide, calcium carbonate, and calcium fluoride.

2. A process according to claim 1, herein the calcium compound is fed as a solid material.

3. A process according to claim 2, wherein the solid aterial is in a form selected form a group which consists of owders, granules, pebbles, and lumps.

4. A process according to claim 1, wherein the calcium compound is fed as a water solution.

5. A process according to claim 1, wherein the calcium compound is fed as a water suspension.

* * * * *